Dec. 18, 1928.   1,695,904

C. R. SODERBERG

BALANCING MACHINE

Filed April 21, 1923   4 Sheets-Sheet 2

WITNESSES:

INVENTOR
Carl Richard Soderberg.
BY
ATTORNEY

Dec. 18, 1928.

C. R. SODERBERG 1,695,904

BALANCING MACHINE

Filed April 21, 1923  4 Sheets-Sheet 3

WITNESSES:

INVENTOR
Carl Richard Soderberg.
BY
ATTORNEY

Dec. 18, 1928.

C. R. SODERBERG 1,695,904

BALANCING MACHINE

Filed April 21, 1923    4 Sheets-Sheet 4

WITNESSES:

INVENTOR
Carl Richard Soderberg.
BY
ATTORNEY

Patented Dec. 18, 1928.

1,695,904

UNITED STATES PATENT OFFICE.

CARL RICHARD SODERBERG, OF EDGEWOOD, PENNSYLVANIA, ASSIGNOR TO WESTINGHOUSE ELECTRIC & MANUFACTURING COMPANY, A CORPORATION OF PENNSYLVANIA.

BALANCING MACHINE.

Application filed April 21, 1923. Serial No. 633,617.

My invention relates to balancing machines, more specifically to machines adapted to indicate the degree of unbalance of rotatable bodies to be tested such as that shown and described in my application, Serial No. 616,713, filed February 3, 1923, of which the present application is a continuation in part.

It is among the objects of this invention to provide a balancing system whereby the general state of unbalance of rotatable bodies may be obtained without segregation into static and dynamic unbalances.

It is a further object of this invention to provide a balancing device in which the oscillatory bed has a constant period of vibration for any location of the fulcrum member.

It is still a further object of this invention to provide a device of the above-designated character which shall be adapted to indicate the unbalanced centrifugal forces of rotatable bodies with uniform accuracy by the application of a theoretical minimum number of correction weights in an expeditious and inexpensive manner.

In my copending applications, Serial No. 593,732, filed October 11, 1922, Serial No. 608,371, filed December 21, 1922, Serial No. 608,372, filed December 21, 1922 and Serial No. 616,713 filed February 3, 1923, I have described several embodiments of a balancing device of the above described general character that is capable of determining the amount and relative location of unbalanced mass in rotating bodies and which comprises a vertically oscillatory bed yieldingly supported upon a base by a plurality of spring members and having a movable fulcrum interposed between the bed and the support.

The movable fulcrum permits the oscillatory bed to vibrate around various axes at right angles to the axis of rotation of the body to be tested. Thus, it is possible to obtain the unbalanced moment with regard to any plane transverse to the axis of rotation of the body. Assuming two transverse planes available for the application of correction weights, which planes are logically at the ends of the rotor to be tested, the unbalance may be corrected by one weight in each of these planes.

By placing the fulcrum axis in one of these planes, the theoretical weight in this plane is eliminated in so far as its effect upon the motion of the vibratory bed is concerned. The effective unbalance is then the theoretical weight in the other transverse plane and this may be determined by several methods. The same reasoning will apply if the fulcrum axis is moved into the other transverse plane when the theoretical weight in the first plane is brought into effect. Whether the weights be obtained by means of a counteracting device or from the amplitude of the motion produced in the system and whether they be located by marking the rotor or by cut and trial or by any other means, in any of these cases, the fundamental principles described below are the same.

The present device is designed to give the same natural period of vibration for any location of the fulcrum axis. This makes it possible to drive the rotor to be balanced at a constant speed and at the same time induce a resonance vibration to the vibrating system for any location of the fulcrum axis. Owing to the usual sharpness of the resonance, it is very essential that the speed at which the body is to be rotated is very nearly that of the natural period of vibration of the vibrating system.

In the accompanying drawings constituting a part hereof and in which like reference characters designate like parts—

Figure 1:
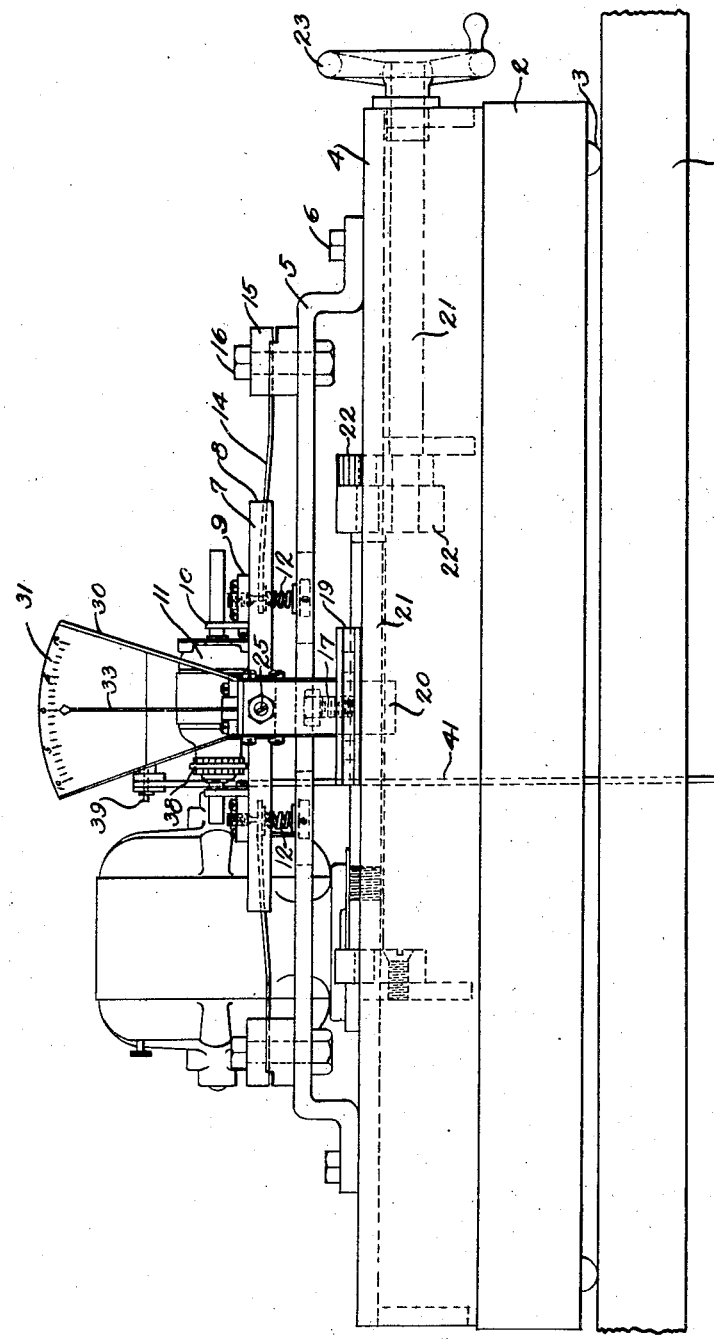
Figure 1 is a front elevational view of a balancing machine embodying the principles of this invention.

Referring to Fig. 1, the apparatus therein illustrated comprises a base 1 and a supporting member 2 mounted thereon, by a plurality of bosses 3, to obtain accurate seating and alinement thereof. A casting or structural member 4, composed of channel bars and the like, is secured to the support 2 and is provided with a projecting support 5 which is secured thereto by a plurality of bolts 6. A bed 7, comprising a pair of longitudinal straps 8 connected by tie rods 9 that are provided with a plurality of journal bearings 10 adapted to rotatably mount a rotor, such as an armature 11 of a motor, is supported by a plurality of helical spring members 12 upon the projecting support 5. A pair of flexible members 14, such as metal straps, are secured at their ends to clamping brackets 15 and the bed 7, respectively, to restrain lateral movement of the bed 7 and to permit vertical movement thereof. The clamping brackets 15 are secured to the ways 5 by a clamping bolt 16.

Figure 2:
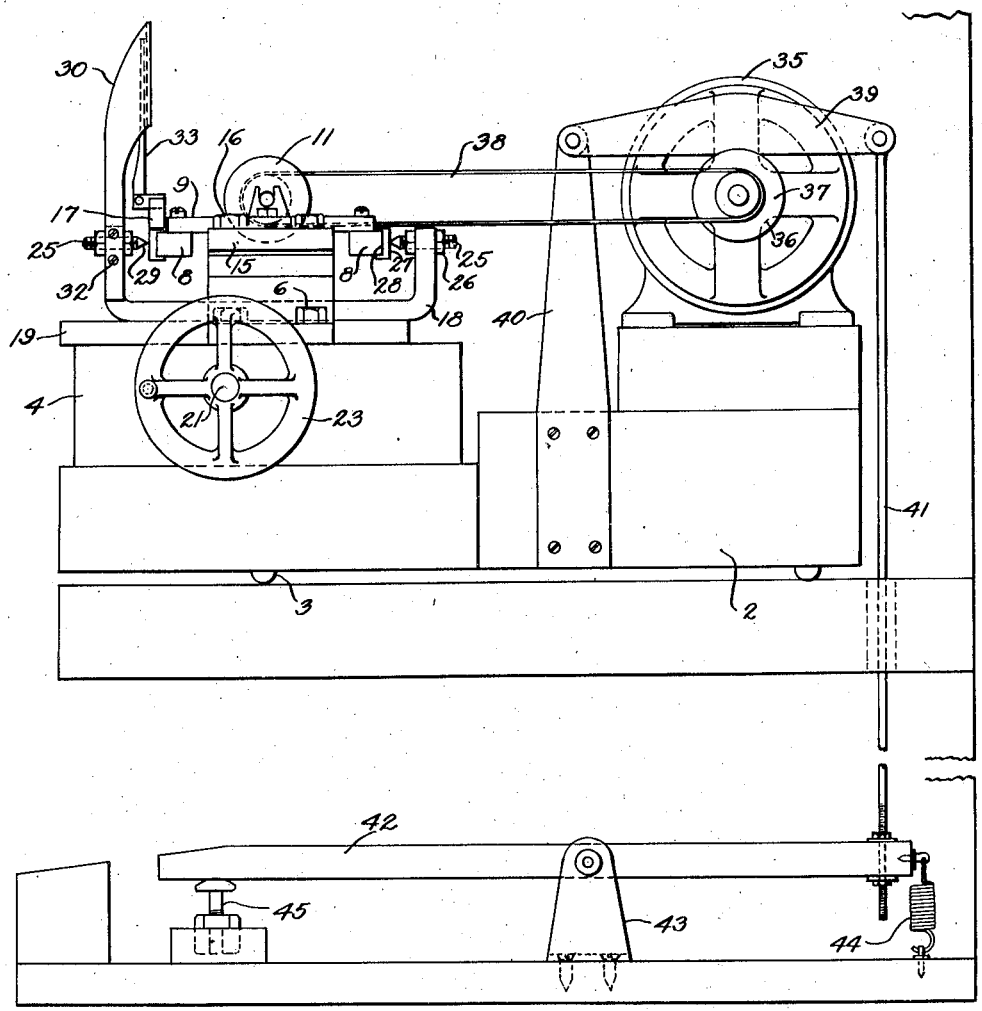
Fig. 2 is an end elevational view thereof.
Figure 3:
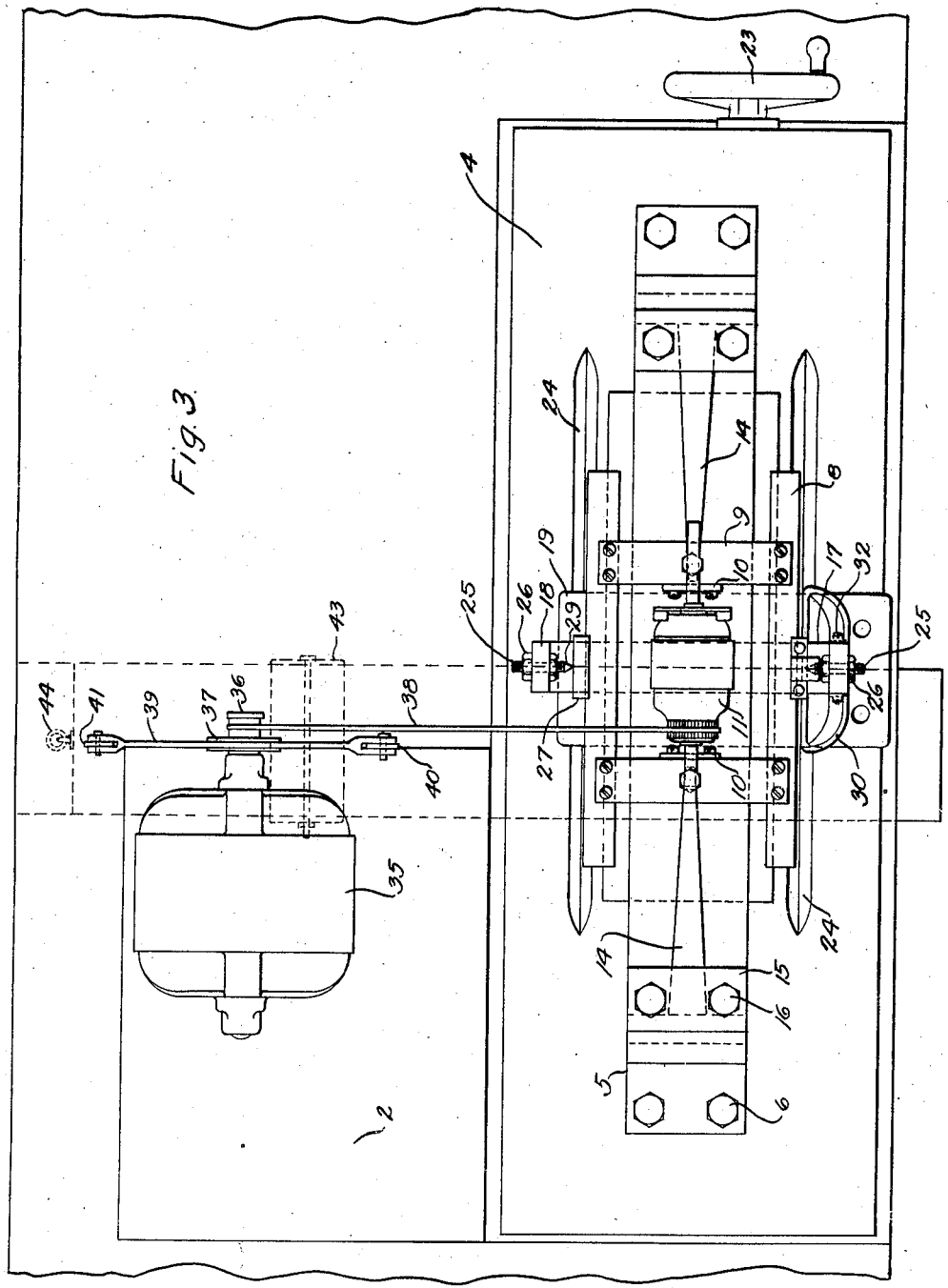
Fig. 3 is a plan view showing the general arrangement of the several cooperating parts.

A movable fulcrum 17 (Figs. 1, 2 and 3) comprises a substantially U-shape bar 18 secured to a carriage 19 and having a threaded nut 20 which is in engagement with a screw shaft 21 journaled in the member 4. The shaft 21 is connected, through gears 22, to a hand wheel 23 secured at the end thereof and by means of which the fulcrum member 17 is moved horizontally along the movable bed 7. The carriage 19 is adapted to move longitudinally in the ways 24 of the support 4. A pair of pin-head screws 25 are secured with lock nuts 26 in the threaded openings provided in the bar 18, and a pair of rectangular slide blocks 27, having a recessed portion 28 adapted to engage the straps 8, are pivotally supported by the center points 29 of the screws 25 to provide oscillatory movement of the blocks 27 relative to the fulcrum screws.

An indicating device, comprising a fan-shape base 30, having suitable graduations 31 formed thereon, is secured to one end of the bar 18, by a plurality of screws 32. An indicating reed 33 is secured on one of the slide blocks 27 to indicate the angular movement of the bed 7, affected by the unbalance of the rotor 11, when operated at suitable speeds.

A motor 35 is mounted on an extension of the support 2 with its shaft 36 parallel with the axis of the rotor 11. A pulley 37 is mounted on the motor shaft, by which it is connected through a belt 38 to the rotor 11 to be tested. A brake, consisting of a lever 39 pivotally mounted on a vertically extending arm 40 secured to the base 2, is provided with a vertically depending rod 41, secured to a tread 42 that is pivoted on a supporting bracket 43 and restrained at one end by a coil spring 44. An electrical switch 45 is mounted underneath the tread 42, and the motor 35 is actuated upon pressing the tread 42 by the foot of the operator, thereby releasing the brake lever 39 and closing the switch 45.

The operation of this device is briefly as follows: The rotor 11 to be tested is placed on the journal bearings 10, and the motor belt 38 is slipped around the commutator or some other convenient part of the rotor. The motor is actuated upon closing the switch 45 and the degree of unbalance of the rotor 11 is indicated by the reed 33 which vibrates across the graduations 31. The correction for unbalance is then made on the rotor, which is again tested by rotating it on the bed 7 to determine the accuracy of the first correction. The operation is repeated until the rotor 11 is in perfect balance, which is usually accomplished by two or three trials.

The correction weights need not be applied to the rotor permanently while testing, but a plurality of graduated wedges or the like may be provided, which are inserted between the coils of the armature until the proper corrections have been made. The weights and location of these wedges are then determined and suitable markings are made. The rotor is then permanently balanced by the addition of weights, which may be done after removing the rotor from the balancing device, thereby allowing the use of the machine for testing exclusively.

The theory of operation of my improved balancing machine will be described in connection with the diagrammatic views of Figs. 4, 5 and 6.

Figure 4:
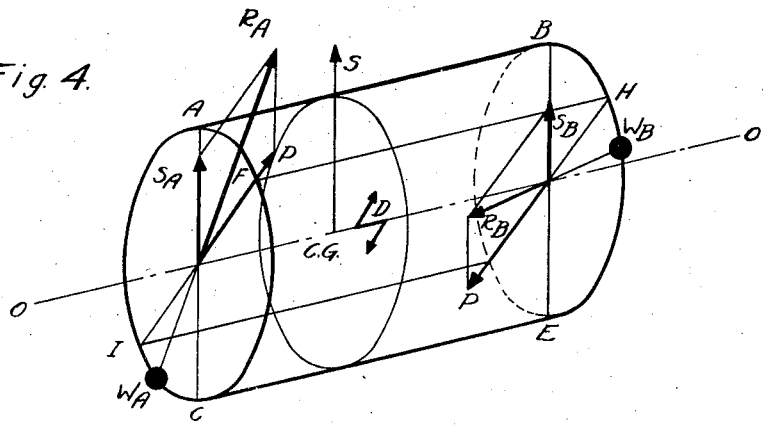
Fig. 4 is a diagrammatic view of a rotatable body indicating the general condition of balance thereof.

Referring to the rotor Fig. 4, when the axis of rotation O—O and the principal axis of inertia do not coincide, the system of centrifugal forces produced by rotation is not in a state of equilibrium and the body is said to be unbalanced. The process of balancing involves a change in the distribution of material such that the principal axis of inertia is brought into coincidence with the axis of rotation.

The principal axis must be displaced parallel with itself until it intersects the axis of rotation, which is equivalent to static balancing. The principal axis must also be rotated about the point of intersection until it is parallel with the axis of rotation, which corresponds to dynamic balancing. This process of balancing brings the center of gravity on the axis of rotation and changes the product of inertia with regard to the proper plane so that the principal axis becomes parallel with the axis of rotation.

These conditions of coincidence are obtained by the addition of a single force and a couple to the initial system of centrifugal forces to counteract the unbalanced centrifugal force and couple of the initial system. This unbalanced force is proportional to the static moment represented by the vector S, Fig. 4, and the couple is proportional to the product of inertia represented by the moment D. S represents the static unbalance measured in mass times length. D represents the amount of the dynamic unbalance measured in mass times length squared. The corresponding centrifugal force and couple are obtained by multiplying S and D respectively by the square of the angular velocity of rotation of the rotor.

The principal axis of inertia is brought into coincidence with O—O by parallel displacement in the plane ABEC and by rotation in the plane FHKI.

Since the couple D can be moved to any position in the plane FHKI, it may be represented by two vectors P in any two transverse planes AC and BE. The vector S may similarly be replaced by its components SA and SB in the transverse planes AC and BE. The vectors SA and P may be replaced by their resultant RA and in the same manner SB and P by RB. The vectors RA and RB are, therefore, equivalent to S and D. It follows that the initial state of unbalance may be corrected in the planes AC and BE by addition or removal of masses $W_A$ and $W_B$, corresponding to the vectors RA and RB respectively.

Figure 5:
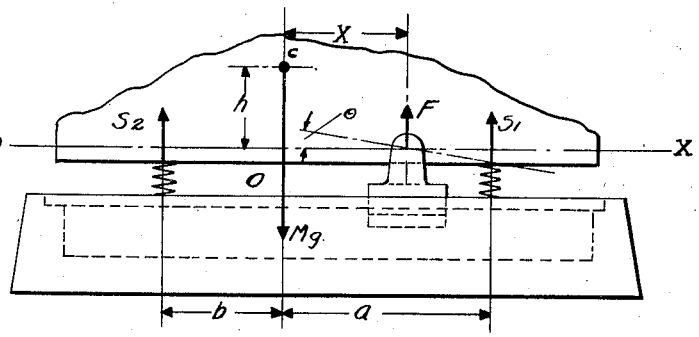
Fig. 5 is a schematic view of the arrangement illustrated in Fig. 1.
Figure 6:
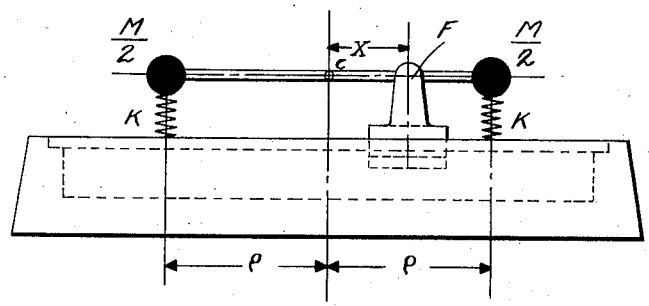
Fig. 6 is a similar view in which the mass of the vibrating system is represented by two equivalent masses.

To obtain a constant period of vibration of the oscillatory system which includes the bed, the journals and the rotor, it is necessary that the springs have predetermined characteristics and are disposed at given distances from the center of gravity of the vibrating system. These relations are established in the following manner:

Referring to Fig. 5, the vibrating system is shown as a compact body having its center of gravity located at C. The weight is carried by the springs and the fulcrum member F, and the system is capable of performing a vibrating motion around parallel axes in the horizontal plane OX. The location of the fulcrum axis will be referred to a reference plane through the center of gravity at right angles to the direction of the motion of the fulcrum axis. The fulcrum axis is always parallel to this plane. Let its distance from this reference plane be $x$, measured so that $x$ is positive for locations to the right of the reference plane and negative for positions to the left. The springs are likewise located with reference to this plane. Let the distances be $a$ and $b$, respectively. The center of gravity of the vibrating body is located at a distance $h$ above the fulcrum plane OX. For the other quantities, assume the following nomenclature:

The mass of the vibrating body—M

Radius of gryration with regard to an axis through the center of gravity parallel to the fulcrum axis.—$i_0$ Characteristics of the springs—$k_1$ and $k_2$ resp.

The characteristics of a spring will be understood to mean the force per unit length deflection; i. e., the slope of the deflection curve.

Spring reactions—$S_1$ and $S_2$ resp.

Reaction on the fulcrum—F

Angle of deflection from position of equilibrium.—$\Theta$ radians

The moment of inertia with regard to the arbitrary fulcrum is, therefore, $$I = M(i_0^2 + h^2 + x^2) \quad (1)$$

If the body is displaced a small angle $\Theta$, the restoring moment $R_1$ is, $$R_1 = S_1(a-x) - S_2(b+x) + Mg(x-h\Theta) + k_1(a-x)^2\Theta + k_2(b+x)^2\Theta \quad (2)$$
$$= S_1(a-x) - S_2(b+x) + Mgx + [k_1(a-x)^2 + k_2(b+x)^2 - Mgh]\Theta$$

The first term is independent of $\Theta$ and represents the restoring moment at rest, hence, it must be zero. The remaining part divided by $\Theta$ is properly defined as the restoring factor for this specific fulcrum location. Hence, $$R = \frac{R^1}{\Theta} = k_1(a-x)^2 + k_2(b+x)^2 - Mgh \quad (3)$$

The differential equation for the motion is therefore, $$I\frac{d^2\Theta}{dt^2} + R\Theta = 0 \quad (4)$$

This represents a harmonic motion, the period of which is, $$T = 2\pi\sqrt{\frac{I}{R}} \quad (5)$$

Replacing T by the corresponding frequency per minute N and introducing the values of I and R from (1) and (3), gives:

$$N = \frac{30}{\pi}\sqrt{\frac{k_1(a-x)^2 + k_2(b+x)^2 - Mgh}{M(i_0^2 + h^2 + x^2)}} \quad (6)$$

Assuming $k_1$, $k_2$, $a$, $b$, M and $h$ to be constants, N is a function of $x$. $k_1, k_2, a, b$, M and $h$ may, on the other hand, be considered as potentially variable. The problem then is to find such combination of $a$, $b$, $k_1$, $k_2$, and $h$ that will make N independent of $x$. The mathematical expression for this is—

$$\frac{\delta N}{\delta x} = 0. \quad (7)$$

which may be replaced by the equivalent equation, $$\frac{\delta(N^2)}{\delta x} = 0. \quad (8)$$

which is easier to evaluate. Then:

$$\frac{\delta N^2}{\delta x} = \frac{M(i_0^2 + h^2 + x^2)[-2K(a-x) + 2K_2(b+x)] - [K_1(a-x)^2 + K_2(b+x)^2 - Mgh]2Mx}{[M(i_0^2 + h^2 + x^2)]^2} \quad (9)$$

The denominator is always positive for all values of $x$. It is sufficient, therefore, to make the numerator equal to zero. This gives, after rearranging—

$$(k_1a-k_2b)x^2 + [(k_1+k_2)(i_o^2+h^2) - (k_1a^2+k_2b^2-Mgh)]x + (k_1a-k_2b)(i_o^2+h^2) = 0. \quad (10)$$

Each individual term must be zero, if the entire expression is zero, for all values of $x$. This gives three equations, two of which, however, are identical. The two equations determining the required relationship between $k_1$, $k_2$, $i_o$, $h$, $a$, $b$ and M are, therefore, $$k_1 a = k_2 b \quad (11^a)$$

$$(k_1+k_2)(i_o^2+h^2) = k_1 a^2 + k_2 b^2 - Mgh \quad (11^b)$$

These are the necessary and sufficient conditions that make N independent of $x$.

To determine which of $k_1$, $k_2$, $a$, $b$, M and $h$ should remain constant in these expressions is a matter of choice and design. For other reasons, it is desirable to make $h$ as small as possible. Assume, therefore, that $h$ is kept constant and that $k_1$, $k_2$, $a$ and $b$ are variable. It is, of course, evident that this variation should be made in such a manner that the speed is not influenced. It is assumed that the mass is kept constant. There are four variables and only two equations. This means that there are an unlimited number of combinations that satisfy equations ($11^a$) and $11^b$). If, however, $$k_1 = k_2 = k \quad (12^a)$$

$$a = b = \delta \quad (12^b)$$

the equations ($11^a$) and ($11^b$) are satisfied, if $$2k(i_o^2+h^2) = 2k\delta^2 - Mgh \quad (13)$$

This gives $$\delta = \sqrt{i_o^2+h^2+\frac{Mgh}{2k}} \quad (14)$$

Equation (6) gives the actual value of N. Introducing ($12^A$) ($12^B$) and (14) into (6) gives $$N = \frac{30}{\pi}\sqrt{\frac{2k}{M}} \quad (15)$$

Thus, if the spring members are identical and located symmetrically with reference to the center of gravity of the vibrating system, the natural frequency is independent of the location of the fulcrum and determined by equation (15), if one-half of the distance between the springs is determined by equation (14).

If the angular velocity, corresponding to N, is represented by $\omega$ it follows that $$\omega = \sqrt{\frac{2k}{M}} \quad (16)$$

Introducing this into the equation (14), gives $$\delta = \sqrt{i_o^2+h^2+\frac{gh}{\omega^2}} \quad (17)$$

As long as $h$ is small, the first term will be dominating. If, however, $h$ should be made large, the second term will be considerable, as will the third, especially at low speeds.

If $h=0$ $$\delta = i_o \quad (18)$$

that is, one-half the distance between the springs should equal radius of gyration of the vibrating systems with reference to the central axis. The same condition occurs if $h$ is negative and of the value, $$h = -\frac{g}{\omega^2} \quad (19)$$

When $h=0$, it is possible to give a simple illustration of the meaning of the principle. The vibrating system may be replaced by two equivalent masses, shown in Fig. 6. If these masses are connected by a weightless member, small oscillations about any fulcrum axis represent vertical movements of the two masses. The natural frequency of a mass $\frac{M}{2}$ supported by a spring with characteristic $k$, is $$N = \frac{30}{\pi}\sqrt{\frac{k}{\frac{M}{2}}} = \frac{30}{\pi}\sqrt{\frac{2k}{M}}$$

which agrees with the result obtained from equation (6).

It is evident from the foregoing that a balancing device comprising a vertically oscillatory bed with a movable fulcrum has a constant period of vibration for any location of the fulcrum axis if any of the following conditions are fulfilled:—

I. Where the general relation between springs, mass and distances are as expressed by equations $11^a$ and $11^b$ above.

II. Where the special relations between springs, mass and distances are as expressed by equations ($12^a$), ($12^b$) and (14) above.

III. Where the special relation between springs, mass and distances are as indicated in Fig. 6.

It is also evident that these conditions may be approximated and still give a working arrangement.

The particular device shown herein represents only one embodiment of my invention and the foregoing theoretical considerations are intended to illustrate the manner in which my object is attained with this particular structure. It will be obvious to those skilled in the art that various modifications of the vibrating system may be utilized without departing from the spirit and scope of my invention, as defined in the appended claims.

I claim as my invention:

1. A balancing machine comprising a base, an oscillatory bed mounted thereon, means on said bed for rotatably mounting a body to be balanced, spring means for yieldingly restraining said bed, and a movable fulcrum interposed between said bed and base with its axis in a plane at right angles to the axis of the body to be balanced, said spring means being arranged to maintain a constant period of vibration of said bed and body for any location of said fulcrum.

2. A balancing machine comprising a spring-borne bed mounted upon a base, a longitudinally movable fulcrum member interposed between said bed and base, said bed and springs being designed to have a constant natural period of vibration for any location of said fulcrum member with a given rotor to be balanced.

3. A balancing machine comprising a movable member yieldingly mounted upon a base and adapted to vibrate about different parallel axes, said movable member being so arranged that its natural period of vibration is independent of the location of the axis of vibration.

4. A balancing machine comprising a movable member yieldingly mounted upon a base by a plurality of spring members, and adapted to vibrate about different parallel axes, said spring members being designed to produce a natural period of vibration independent of the position of the axis of vibration.

5. A balancing machine comprising a movable member yieldingly mounted upon a base by a plurality of spring members and adapted to vibrate about different parallel axes, said movable member and spring members being designed to produce a natural period of vibration independent of the position of the axis of vibration.

6. A balancing machine comprising a vertically oscillatory bed supported by a plurality of springs upon a base, means on said bed for rotatably supporting a rotor to be tested, and a movable fulcrum having its axis in a plane at right angles to the axis of said rotor interposed between said bed and base, said springs being designed to effect a constant period of vibration of said bed and rotor irrespective of the location of its fulcrum.

7. A balancing machine comprising a vertically oscillatory bed, a plurality of springs upon which said bed is yieldingly mounted, a base and a movable fulcrum interposed between said bed and base, said springs being disposed at distances equal to the radius of gyration of the vibrating system with regard to an axis coinciding with the neutral location of the fulcrum axis.

8. A balancing machine comprising a stationary support, a pair of parallel ways mounted thereon, a vertically movable bed secured by a plurality of yielding supports on said ways, a fulcrum member movably mounted on said ways and adapted to slidingly engage said bed, an indicating device secured to said fulcrum to denote the oscillatory movement of said bed, means for rotatably mounting a body to be tested on said bed, and means extrinsic of said bed for actuating said body.

9. A balancing machine comprising a stationary support, a pair of parallel ways mounted thereon, an oscillatory bed associated with said ways, a plurality of spring members connecting said bed and ways, flexible strap members secured to the respective ends of said bed and to brackets on said supports, a plurality of journal brackets on said bed for rotatably mounting a rotor, a fulcrum member movably mounted on said ways and in sliding engagement with the parallel longitudinal edges of the bed, means for actuating said rotor, and means for indicating the relative degree of unbalance of said rotor.

10. A balancing machine comprising a stationary support, a pair of parallel ways mounted thereon, an oscillatory bed associated with said ways, a plurality of spring members connecting said bed and ways, flexible strap members secured to the respective ends of said bed and to brackets on said supports, a plurality of journal brackets on said bed for rotatably mounting a rotor, a fulcrum member movably mounted on said ways and in sliding engagement with the parallel longitudinal edges of the bed, a motor mounted on said support having means for actuating and stopping the rotor thereof, and means for connecting said motor to the rotor to be tested.

11. A balancing machine comprising a stationary support, an oscillatory bed mounted thereon, a movable fulcrum intermediate said bed and support, an indicating device comprising a graduated shield and an indicating reed associated with said fulcrum and bed, and means for rotatably mounting a rotor to be balanced on said bed.

12. A balancing machine comprising a base, a vibrating system mounted on said base, said vibrating system comprising a plurality of springs, a bed member mounted on said springs and means disposed on said bed member for rotatably mounting a rotor to be balanced; and a movable fulcrum member interposed between said bed and said base, said fulcrum member having its axis in a plane at right angles to the axis of the rotor to be balanced; the mass and resilience of said vibrating system being so arranged that the natural period of vibration is the same for all positions of the fulcrum member.

13. A balancing machine comprising a base, a spring system mounted on said base, an oscillatable bed member carried by said spring system, means disposed on said bed member for rotatably supporting a rotor to be balanced and a movable fulcrum member interposed between the base and the bed member, said spring system comprising two spring members disposed on either side of an axis through the center of gravity of the bed member and the rotor to be balanced and parallel to the fulcrum axis at a distance equal to the radius of gyration of the bed member and the rotor.

14. A balancing machine comprising a base, a pair of spring members mounted on said base, an oscillatable bed member adapted to be loaded with a rotor to be tested supported on said spring members, means disposed on said bed member for rotatably supporting the rotor to be tested and a fulcrum member interposed between said bed and said base, said fulcrum member being movable in a plane at right angles to its axis, and said spring members being so placed and proportioned that the natural period of vibration of the loaded bed member will remain the same for any position of the fulcrum member.

15. A balancing machine comprising a base, a vibrating system comprising an oscillatory bed member, resilient means for supporting said bed on said base, means disposed on said bed for rotatably supporting a rotor to be tested and a movable fulcrum member interposed between said bed and said base, said fulcrum having its axis in a plane at right angles to the axis of rotation of the rotor to be tested and being movable parallel thereto, the resilient supporting means and the combined mass of the bed member and the rotor to be tested being so arranged that the natural period of vibration of the vibrating system is the same for all positions of the fulcrum member.

16. A balancing machine comprising a base, resilient supporting means mounted on the base, an oscillatable bed supported on said resilient means, means disposed on the bed for loading it with a rotor to be balanced and a fulcrum member interposed between said bed and said base, said fulcrum member being movable at right angles to its axis and said resilient supporting means comprising two spring members of equal characteristics and disposed at distances equal to the radius of gyration of the loaded bed from the axis through the center of gravity of the bed and parallel to the fulcrum axis.

17. In a balancing machine, a vibrating system, means for rotatably supporting a rotor to be tested on said vibrating system and a movable fulcrum member having its axis disposed in a transverse plane of said rotor, said vibrating system being so arranged that with a given rotor to be tested its natural frequency of vibration is the same for all positions of the fulcrum member.

In testimony whereof, I have hereunto subscribed my name this 3rd day of April 1923.

CARL RICHARD SÖDERBERG.